(12) United States Patent
Kameyama

(10) Patent No.: US 7,481,697 B2
(45) Date of Patent: Jan. 27, 2009

(54) HEAD SLIDER AND METHOD OF MANUFACTURING SAME

(75) Inventor: Masaki Kameyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/903,617

(22) Filed: Sep. 24, 2007

(65) Prior Publication Data
US 2008/0019050 A1 Jan. 24, 2008

Related U.S. Application Data

(60) Division of application No. 10/677,895, filed on Oct. 2, 2003, now abandoned, which is a continuation-in-part of application No. PCT/JP01/02949, filed on Apr. 5, 2001.

(51) Int. Cl.
*B24B 49/00* (2006.01)
(52) U.S. Cl. ............................ 451/11; 451/41; 451/55; 360/235.7; 360/236.5
(58) Field of Classification Search .................. 451/10, 451/11, 41, 55, 59; 360/235.7, 235.8, 236.5, 360/236.6, 236.7
See application file for complete search history.

(56) References Cited

U.S. PATENT DOCUMENTS

| | | | |
|---|---|---|---|
| 4,218,715 A | 8/1980 | Garnier | |
| 4,670,806 A | 6/1987 | Ghose | |
| 5,550,639 A | 8/1996 | Sugita | |
| 6,349,018 B2 | 2/2002 | Koishi et al. | |
| 6,351,345 B1 | 2/2002 | Kameyama | |
| 6,501,622 B2 | 12/2002 | Koishi | |
| 6,879,463 B2 | 4/2005 | Kanda | |
| 6,891,699 B2* | 5/2005 | Kameyama et al. | 360/235.7 |
| 7,372,665 B1* | 5/2008 | Stoev et al. | 360/128 |
| 2002/0191326 A1* | 12/2002 | Xu et al. | 360/75 |
| 2006/0066978 A1* | 3/2006 | Takagi et al. | 360/75 |
| 2008/0100966 A1* | 5/2008 | Ozeki | 360/235.4 |

FOREIGN PATENT DOCUMENTS

| | | |
|---|---|---|
| JP | 60-107715 | 6/1985 |
| JP | 06012807 | 1/1994 |
| JP | 6-349025 | 12/1994 |
| JP | 7-057219 | 3/1995 |
| JP | 7-307070 | 11/1995 |
| JP | 9-293221 | 11/1997 |
| JP | 10-049850 | 2/1998 |
| JP | 2000-173217 | 6/2000 |
| JP | 2000-306226 | 11/2000 |

* cited by examiner

*Primary Examiner*—Eileen P. Morgan
(74) *Attorney, Agent, or Firm*—Greer, Burns & Crain, Ltd.

(57) ABSTRACT

A head slider having an air inlet end and an air outlet end includes a rail having a flat air bearing surface for generating floating force when the disk rotates, the rail being disposed on a disk-facing surface; and an electromagnetic transducer disposed near the air outlet end where the rail is positioned. The head slider has a cavity on the air outlet end near the electromagnetic transducer.

4 Claims, 15 Drawing Sheets

F I G. 18
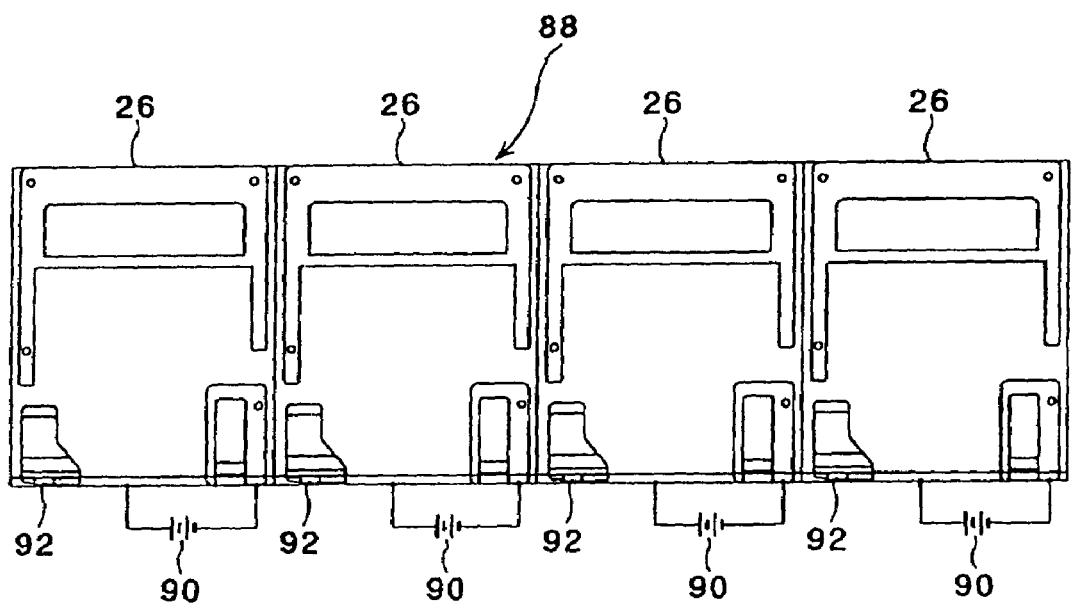
F I G. 19
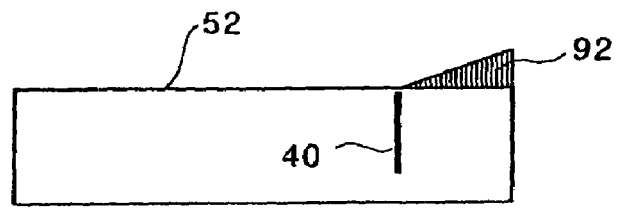

HEAD SLIDER AND METHOD OF MANUFACTURING SAME

This is a divisional of application Ser. No. 10/667,895, filed Oct. 2, 2003, now abandoned which is a continuation of International PCT Application No. PCT/JP01/02949 filed Apr. 5, 2001, which was not published in English.

BACKGROUND OF THE INVENTION

1. Field of the Invention

The present invention relates to a head slider for use in disk apparatuses, and a method of manufacturing such a head slider.

2. Description of the Related Art

In recent years, there have been demands for smaller and larger-capacity magnetic disk apparatuses as one type of external storage device for use with computers. One proposal for increasing the storage capacity of magnetic disk apparatuses is to increase the number of magnetic disks mounted on a spindle motor. Based on the proposal, recently available magnetic disk apparatuses have disks that are installed at smaller spaced intervals. Magnetic disk apparatuses that are available today often employ a contact-start-stop (CSS) floating magnetic head slider. When the magnetic disk apparatus is stopped, the CSS floating magnetic head slider is held in contact with a magnetic disk. When the magnetic disk apparatus operates to record or reproduce information, the CSS floating magnetic head slider floats off the surface of a magnetic disk by a minute gap therebetween due to an airflow that is produced on the surface of the magnetic disk that is rotating at a high speed.

The CSS floating magnetic head slider incorporates an electromagnetic transducer (magnetic head element) that is subject to the airflow that is produced on the surface of the magnetic disk. The magnetic head slider is supported by a suspension. When the magnetic disk is not rotating, the magnetic head slider that incorporates the electromagnetic transducer therein is held against the surface of the magnetic disk. When the magnetic disk is rotating, the magnetic head slider flows off the magnetic disk due to the airflow that is produced by the rotation of the magnetic disk and acts on a floating surface of the magnetic head slider. The electromagnetic transducer incorporated in the magnetic head slider moves over the surface of the magnetic disk while being supported by the suspension, and records information on and reproduces information from tracks on the magnetic disk.

Heretofore, the magnetic disk apparatuses that employ the floating magnetic head slider have a pair of rails mounted on laterally opposite ends of the magnetic head slider that face the magnetic disk. Each of the rails has a flat air bearing surface. Each of the rails also has a tapered surface on its air inlet side. An airflow that is produced when the magnetic disk rotates at a high speed impinges upon the air bearing surfaces, causing the magnetic head slider to float to keep the electromagnetic transducer spaced from the surface of the magnetic disk by a stable minute gap.

The CSS floating magnetic head slider assures high floating stability and a minute floating gap (submicrons). However, when the magnetic disk is stopped, the air bearing surfaces of the magnetic head slider are held in contact with the magnetic disk. At the time the magnetic disk apparatus starts and stops operating, the magnetic disk and the air bearing surfaces slide against each other. Therefore, the magnetic disk has, on its recording layer, a protective layer made of a hard material such as carbon or the like and a lubricating layer for reducing friction and wear of the protective film to increase the durability of the magnetic disk. Although the lubricating layer is effective to reduce friction and wear of the protective film, the lubricating layer allows the magnetic disk and the magnetic head slider to stick to each other when the magnetic disk apparatus stops its operation, with the result that the magnetic disk apparatus may not be able to start operating.

In order to solve the problem of sticking between the magnetic head slider and the magnetic disk, it has been proposed to provide a plurality of pads (projections) on the floating surface (the air bearing surfaces) of the magnetic head slider for thereby reducing the area of contact between the magnetic head slider and the surface of the magnetic disk (see Japanese Patent Laid-open No. Hei 8-69674, for example). There is another magnetic head slider in which sticking prevention pads are disposed on a stepped surface lower than the air bearing surfaces, the sticking prevention pads having a height slightly greater than the height of the air bearing surfaces.

The electromagnetic transducer includes a recording coil embedded in an insulating protective film made of $Al_2O_3$, for example. For writing data, a voltage modulated by the data is applied to the recording coil, which generates a magnetic signal that is recorded on the magnetic disk. In recent magnetic head drives, the recording coil generates more heat as the data is transferred thereto at a higher rate. When the recording coil generates increased heat, the insulating protective film with the electromagnetic transducer embedded therein is thermally expanded and projects from the floating surface (the air bearing surfaces) of the magnetic head slider. Since the recent magnetic head drives are designed to cause the magnetic head slider to float off the magnetic disk by a smaller gap than ever, if the recording coil significantly projects from the floating surface, then the projecting portion of the insulating protective film tends to contact the magnetic disk with an increased probability, possibly causing a head crash.

SUMMARY OF THE INVENTION

It is therefore an object of the present invention to provide a head slider which is arranged to prevent a projecting portion of a protective film, which occurs due to the heating of an electromagnetic transducer, from unduly projecting, and hence to prevent a head crash from occurring.

In accordance with an aspect of the present invention, there is provided a head slider having an air inlet end and an air outlet end, including a rail having a flat air bearing surface for generating a floating force when the disk rotates, the rail being disposed on a disk-facing surface, and an electromagnetic transducer disposed near the air outlet end where the rail is positioned, the head slider having a cavity on the air outlet end near the electromagnetic transducer.

Preferably, the cavity is approximated by a curved surface that is represented by:

$$z = f(x) \cdot g(y)$$

where z represents the depth of the cavity, x the position thereof in the longitudinal direction of the head slider, y the position thereof in the transverse direction of the head slider, $f(x) = a_m x^m + a_{m-1} x^{m-1} + \ldots + a_1 x + a_0$, $g(y) = b_n y^n + b_{n-1} y^{n-1} + \ldots + b_1 y + b_0$, and m and n are an integer of 2 or greater. Alternatively, the cavity is approximated by a curved surface which is represented by an equation which is similar to the above equation except that at least one of f(x) and g(y) is replaced with a sine function.

Preferably, the cavity is formed by removing a portion of the head slider which projects from the disk-facing surface when a predetermined voltage is applied to the electromagnetic transducer. Alternatively, the cavity is formed by removing a portion of the head slider that floats less than the electromagnetic transducer when a predetermined voltage is applied to the electromagnetic transducer while the head slider is normally floating.

In accordance with another aspect of the present invention, there is provided a head slider having an air inlet end and an air outlet end, including a front rail disposed on a disk-facing surface adjacent to the air inlet end and having a flat air bearing surface for generating a floating force when the disk rotates, a pair of rear rails disposed on the disk-facing surface adjacent to the air outlet end and each having respective flat air bearing surfaces for generating a floating force when the disk rotates, a groove defined downstream of the front rail for expanding air once compressed by the front rail to develop a negative pressure, and a plurality of pads disposed on the front rail and at least one of the rear rails, the head slider having a cavity on the air outlet end near the electromagnetic transducer.

In accordance with a further aspect of the present invention, there is provided a method of manufacturing a head slider having an electromagnetic transducer near an air outlet end, including the steps of applying a predetermined voltage to the electromagnetic transducer, and polishing off a portion of the head slider which projects from a disk-facing surface when a predetermined voltage is applied to the electromagnetic transducer.

In accordance with a still further aspect of the present invention, there is provided a method of manufacturing a head slider having an electromagnetic transducer near an air outlet end, including the steps of rotating a polishing member at a predetermined rotational speed, causing the head slider to flow with an airflow which is generated when the polishing member is rotated, applying a predetermined voltage to the electromagnetic transducer, and polishing off a portion of the head slider which projects from a disk-facing surface and a portion of the head slider which floats less than the electromagnetic transducer when the predetermined voltage is applied to the electromagnetic transducer.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 18 is a plan view of electromagnetic transducers mounted on a row bar, with a voltage being applied to each of the electromagnetic transducers;

FIG. 19 is a schematic left-hand side elevational view of the electromagnetic transducers shown in FIG. 18;

DETAILED DESCRIPTION OF THE PREFERRED EMBODIMENTS

Figure 1:
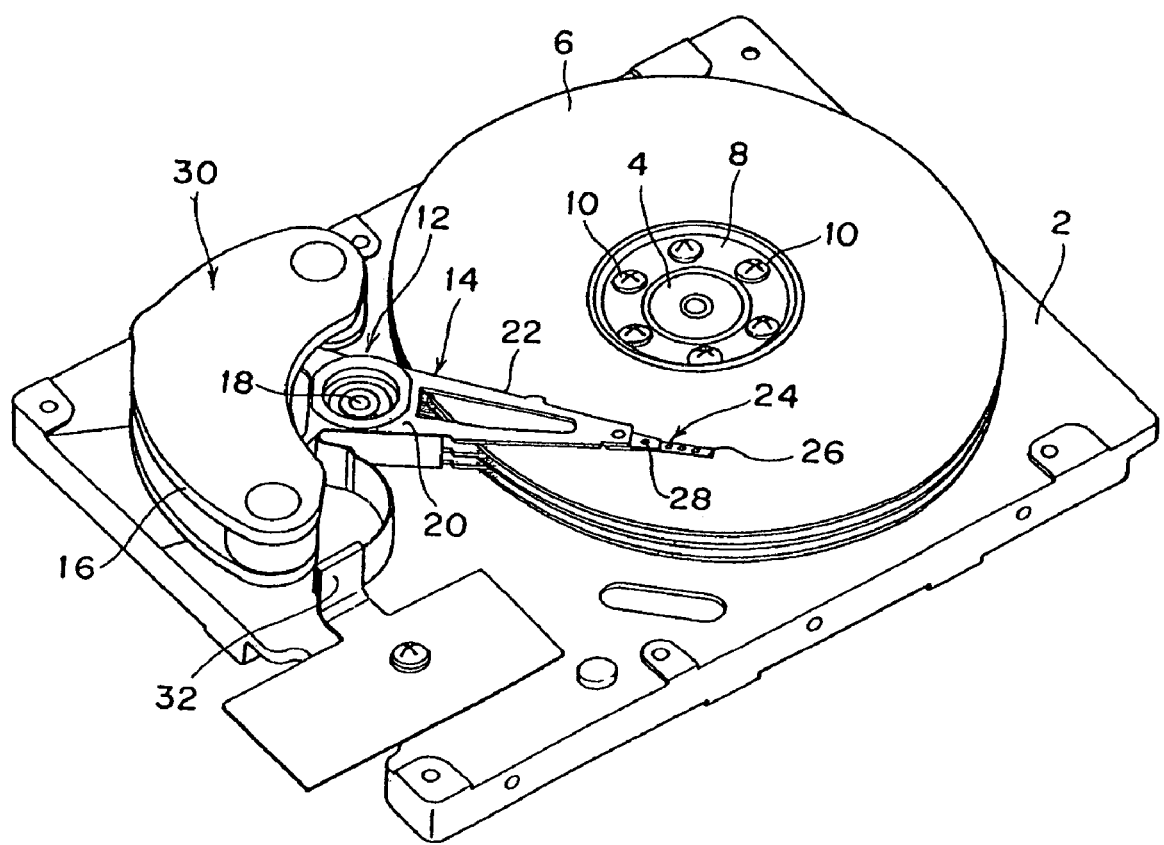
FIG. 1 is a perspective view of a magnetic disk apparatus with a cover removed from illustration.

A number of embodiments of the present invention will be described below with reference to the drawings. Those parts that are essentially identical in the description of the embodiments are denoted by identical reference characters. FIG. 1 shows in perspective a magnetic disk apparatus with a cover removed from illustration. As shown in FIG. 1, a shaft 4 is fixedly mounted on a base 2, and a spindle hub (not shown) rotatable by a DC motor is disposed around the shaft 4. Magnetic disks 6 and spacers (not shown) are alternately fitted over the shaft 4. The magnetic disks 6 are mounted at spaced intervals on the spindle hub by a disk clamp 8 that is fastened to the spindle hub by a plurality of screws 10.

A rotary actuator 12 includes an actuator arm assembly 14 and a magnetic circuit 16. The actuator arm assembly 14 is rotatably mounted on a shaft 18 that is fixedly mounted on the base 2. The actuator arm assembly 14 includes an actuator block 20 rotatably mounted on the shaft 18 by a pair of bearings, a plurality of actuator arms 22 extending in one direction from the actuator block 20, and a plurality of head assemblies 24 secured to the respective distal ends of the actuator arms 22. Each of the head assemblies 24 includes a magnetic head slider 26 having a magnetic head element (electromagnetic transducer) for writing and reading data on the magnetic disk 6 and a suspension 28 supporting the magnetic head slider 26 on its distal end and having a proximal end secured to the actuator arm 22.

A coil (not shown) is supported by the actuator block 20 remotely from the actuator arms 22 across the shaft 18. The coil is inserted in a gap in the magnetic circuit 16, making up a voice coil motor (VCM) 30. A flexible printed circuit (FPC) board 32 for supplying a write signal to the magnetic head element and receiving a read signal from the magnetic head element has an end fixed to a side of the actuator block 20.

Figure 2:
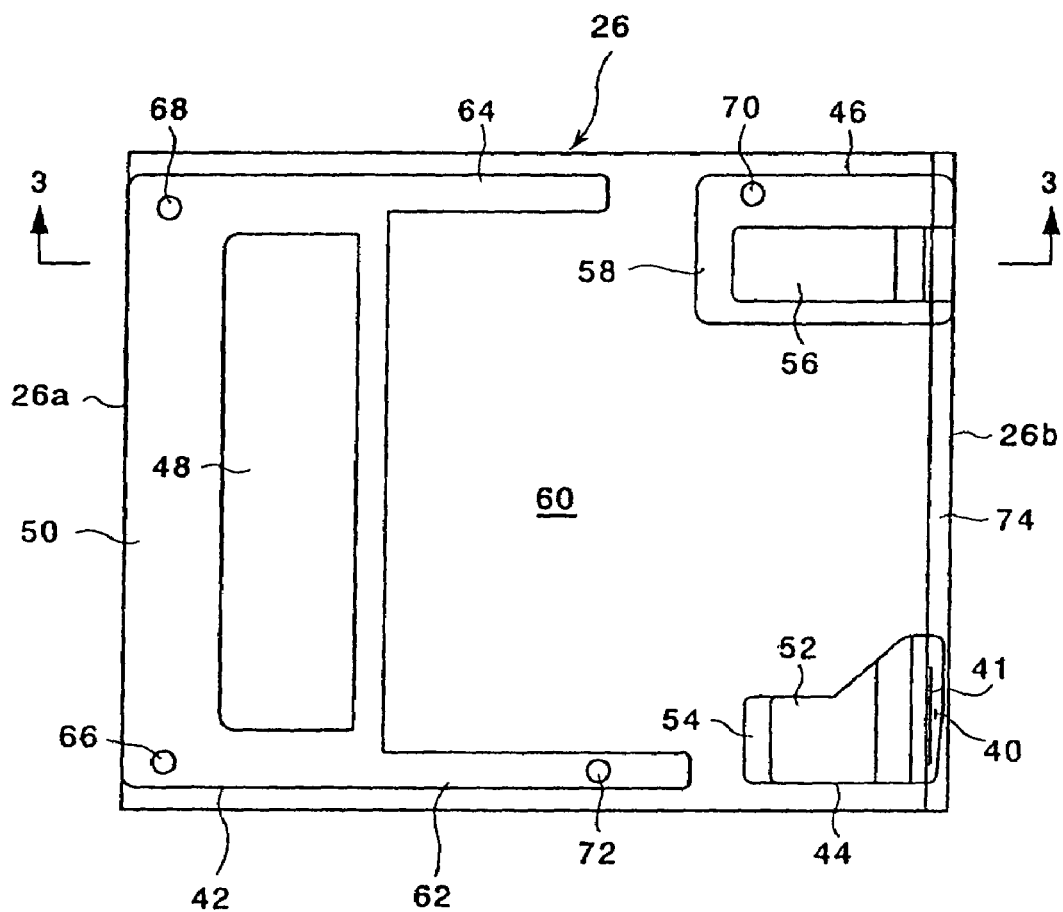
FIG. 2 is a plan view of a magnetic head slider according to an embodiment of the present invention.
Figure 3:
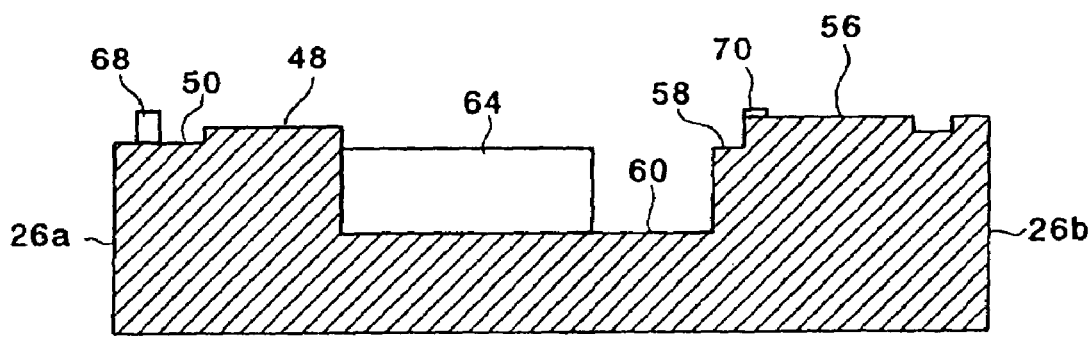
FIG. 3 is a cross-sectional view taken along line 3-3 of FIG. 2.

FIG. 2 shows in plan the magnetic head slider 26 according to an embodiment of the present invention. FIG. 3 is a cross-sectional view taken along line 3-3 of FIG. 2. As shown in FIGS. 2 and 3, the magnetic head slider 26 is in the shape of a rectangular parallelepiped and has an air inlet end 26a and an air outlet end 26b. The magnetic head slider 26 includes a negative-pressure magnetic head slider and has a front rail 42 disposed near the air inlet end 26a and a pair of rear rails 44, 46 disposed near the air outlet end 26b.

The front rail 42 has on it top an air bearing surface 48 extending transversely across the magnetic head slider 26 and a stepped surface 50 that is lower a predetermined step than the air bearing surface 48. Similarly, the rear rails 44, 46 have on their top respective air bearing surfaces 52, 56 and respective stepped surfaces 54, 58 that are lower a predetermined step than the air bearing surfaces 52, 56, respectively.

The air bearing surface 52 is smaller in size than the other air bearing surface 56. With the negative-pressure magnetic head slider 26, therefore, a larger floating force is generated by the air bearing surface 56 than by the air bearing surface 52. The magnetic head slider 26 also has an electromagnetic transducer 40 and a shield 41 disposed on the rear rail 44 near the air outlet end 26b. The distance between the magnetic head slider 26 and the surface of the magnetic disk is smallest in the vicinity of the electromagnetic transducer 40.

When the magnetic disk rotates, producing an airflow along the surface thereof, the airflow acts on the air bearing surfaces 48, 52, 56. As a result, the air bearing surfaces 48, 52, 56 produce floating forces for causing the magnetic head slider 26 float off the surface of the magnetic disk. Though the stepped surfaces 50, 54, 58 also produce floating forces, these floating forces are not significantly large. The air bearing surface 48 generates a large floating surface for keeping the magnetic head slider 26 tilted at a pitch angle a when the magnetic head slider 26 is floating. The pitch angle a refers to an angle at which the magnetic head slider 26 is tilted along the airflow.

The magnetic head slider 26 has a pair of side rails 62, 64 disposed on respective opposite sides thereof that are spaced transversely across the magnetic head slider 26, and extending contiguously to the front rail 42. The magnetic head slider 26 also has a groove 60 defined therein downstream of the front rail 42 and having a depth ranging from about 2 to 3 μm. The airflow that flows along the air bearing surface 48 passes across the front rail 42 and spreads into the groove 60 perpendicularly to the surface of the magnetic disk, thus generating a negative pressure in the groove 60. The negative pressure counterbalances the floating force referred to above, determining the distance by which the magnetic head slider 26 floats off the surface of the magnetic disk.

Pads 66, 68 are disposed on the stepped surface 50 of the front rail 42, and a pad 70 is also disposed on the stepped surface 58 of the rear rail 46. Another pad 72 is disposed on the side rail 62. The pad 72 disposed near the rear rail 44 which produces a smaller floating force is positioned upstream of the pad 70 disposed on the rear rail 46 which produces a larger floating force. Since the pad 72 is displaced upstream, the pad 72 is prevented from contacting the surface of the magnetic disk when the magnetic disk apparatus is in normal operation. The pads 66, 68, 70 and 72 have substantially the same height. The electromagnetic transducer 40 and the shield 41 are embedded in an insulating protective film 74 that is made of $Al_2O_3$.

Figure 4:
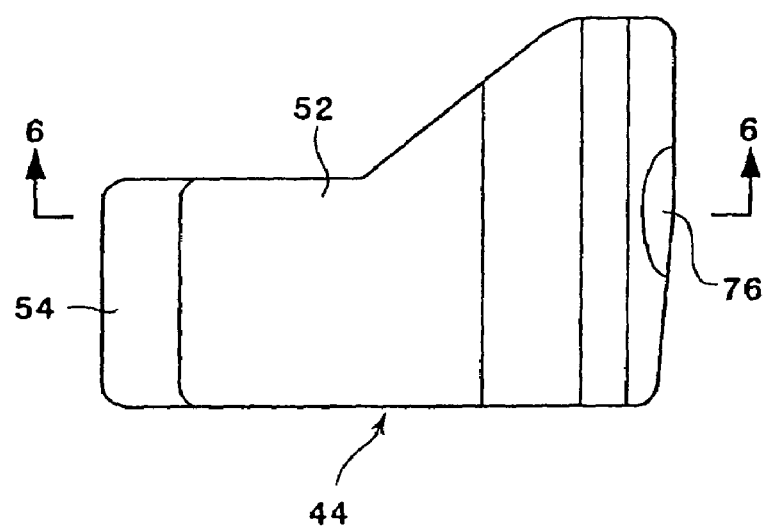
FIG. 4 is an enlarged plan view of a rear rail.
Figure 5:
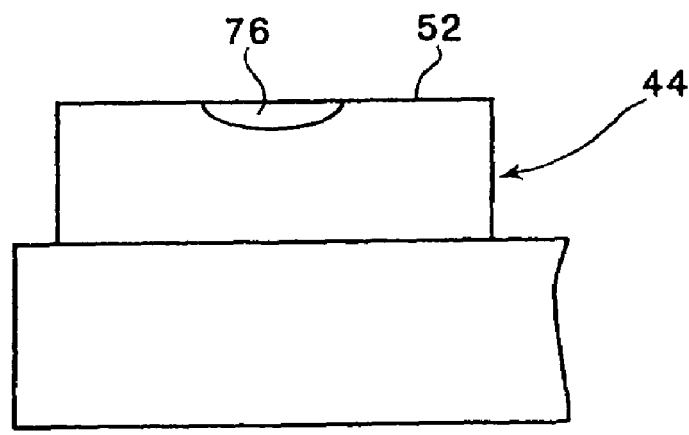
FIG. 5 is a right-hand side elevational view of the rear rail shown in FIG. 4.
Figure 6:
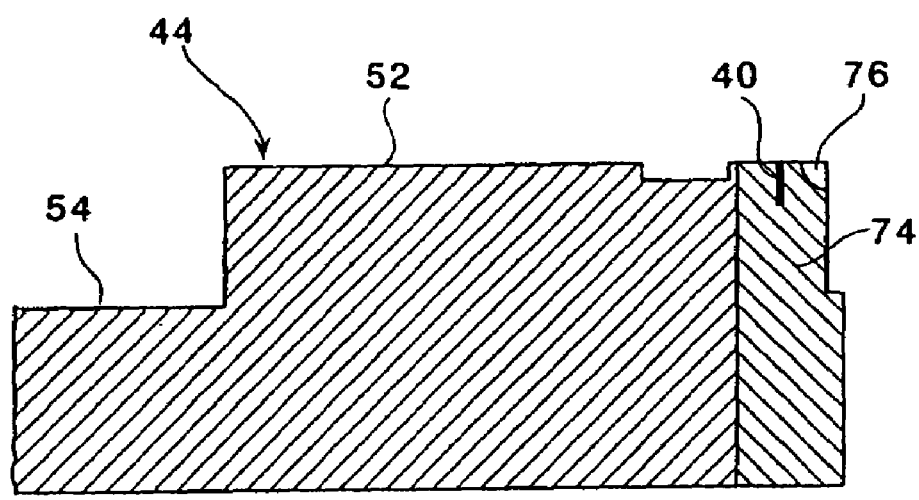
FIG. 6 is a cross-sectional view taken along line 6-6 of FIG. 4.

FIG. 4 shows the rear rail 44 in enlarged plan. FIG. 5 is a right-hand side elevational view of the rear rail shown in FIG. 4, and FIG. 6 is a cross-sectional view taken along line 6-6 of FIG. 4. The magnetic head slider 26 according to the present embodiment has a cavity 76 defined in the air outlet end thereof near the electromagnetic transducer 40. When the electromagnetic transducer 40 is energized to record information on the magnetic disk, the electromagnetic transducer 40 including a recording coil is heated, thermally expanding the protective film 74. However, since the cavity 76 is defined in the air outlet end of the magnetic head slider 26 near the electromagnetic transducer 40, the protective film 74 at the cavity 76 is thermally expanded and is prevented from projecting upwardly in FIG. 6 from the air bearing surface 52. Specifically, while the magnetic disk 26 is floating off the magnetic disk, the thermally expanded protective film 74 is prevented from projecting toward the magnetic disk. Therefore, the probability that the magnetic head slider 26 and the magnetic disk will contact each other due to an undue projection of the protective film 74 is lowered.

Figure 7:
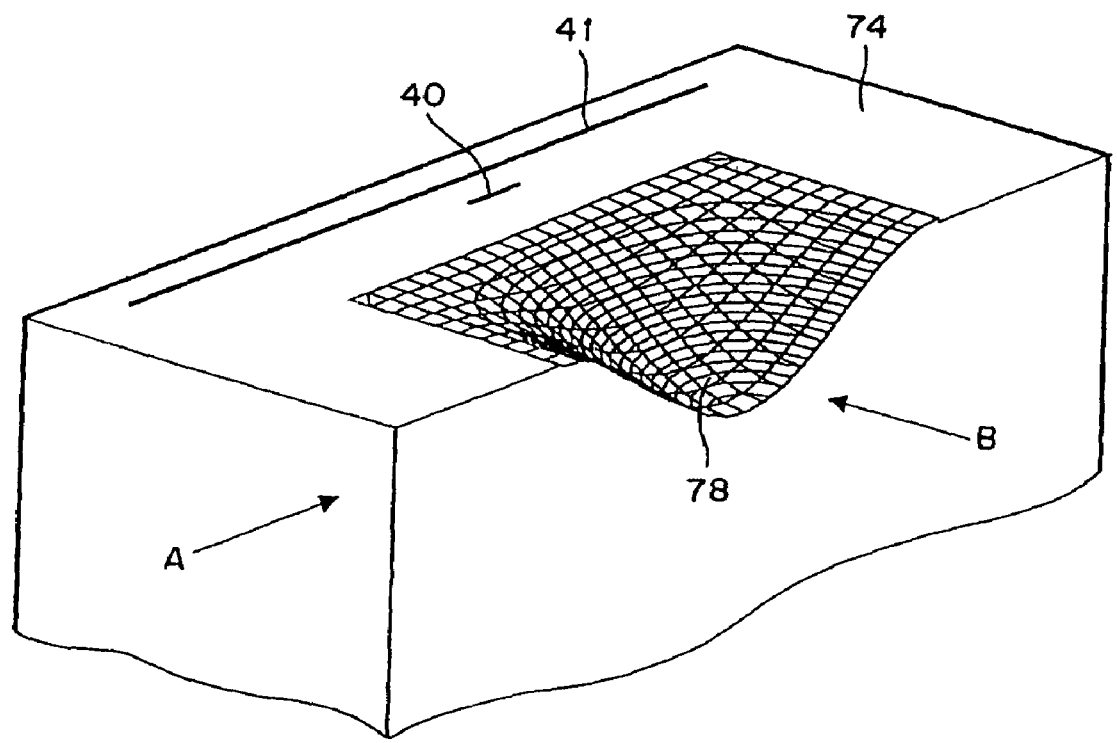
FIG. 7 is an enlarged fragmentary perspective view of the magnetic head slider near an electromagnetic transducer.
Figure 8:
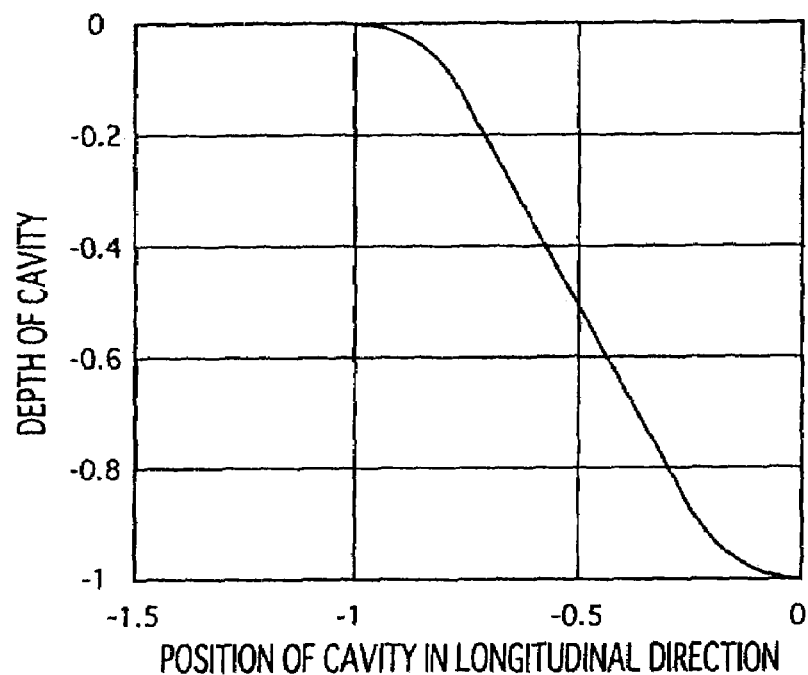
FIG. 8 is a diagram showing a cross-sectional shape of a cavity, as viewed in the direction indicated by the arrow A in FIG. 7.
Figure 9:
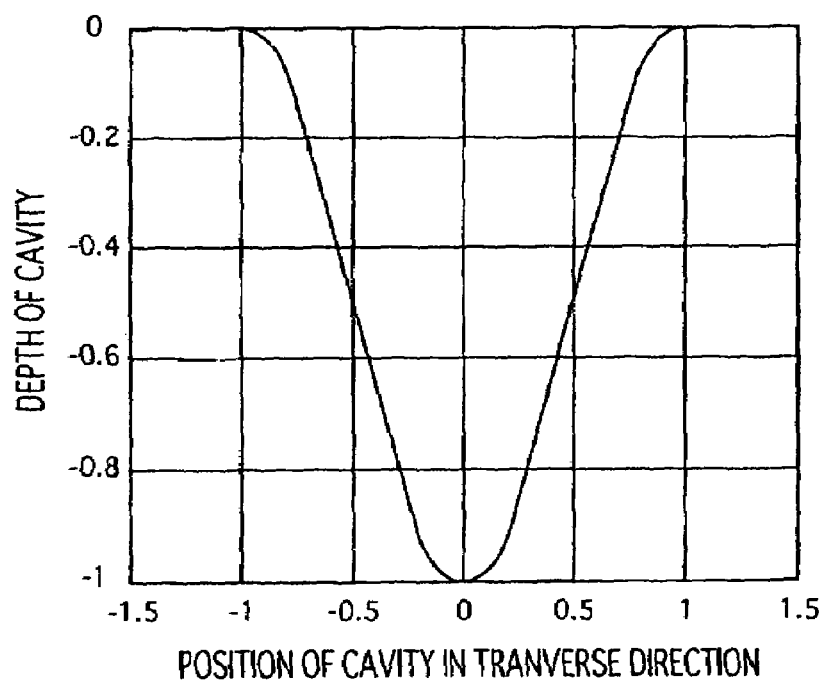
FIG. 9 is a diagram showing a cross-sectional shape of the cavity, as viewed in the direction indicated by the arrow B in FIG. 7.

FIG. 7 is an enlarged fragmentary perspective view of the magnetic head slider near the electromagnetic transducer 40, the magnetic head slider having a cavity 78 disposed on the air outlet end near the electromagnetic transducer 40 and having a curved surface represented by the equation (1) shown below. FIG. 8 is a diagram showing a cross-sectional shape of the cavity 78, as viewed in the direction indicated by the arrow A in FIG. 7, and FIG. 9 is a diagram showing a cross-sectional shape of the cavity 78, as viewed in the direction indicated by the arrow B in FIG. 7.

$$z=(x^2-1)(-y^2+1) \tag{1}$$

where
  z=the depth of the cavity (air bearing surface=0),
  x=the position of the cavity in the transverse direction (the center of the electromagnetic transducer 40=0), and
  y=the position of the cavity in the longitudinal direction (the air outlet end=0).

The units of x, y and z are dimensionless. The width of the cavity 78 is 200 μm, the length of the cavity 78 is 25 μm, and the depth of the cavity 78 is 30 nm.

The cavity shape may be a curved shape represented by the equation (2), shown below, which is a generalization of the equation (1).

$$z=f(x) \cdot g(y) \tag{2}$$

where
  z=the depth of the cavity,
  x=the position of the cavity in the transverse direction of the slider,
  y=the position of the cavity in the longitudinal direction of the slider, $$f(x)=a_m x^m + a_{m-1} x^{m-1} + \ldots + a_1 x + a_0,$$

$$g(y)=b_n y^n + b_{n-1} y^{n-1} + \ldots + b_1 y + b_0, \text{ and}$$

m and n are an integer of 2 or greater.

The cavity shape may be a shape approximated by a curved surface represented by an equation which is similar to the equation (2) except that at least one of f(x) and g(y) is replaced with a sine function.

Figure 10:
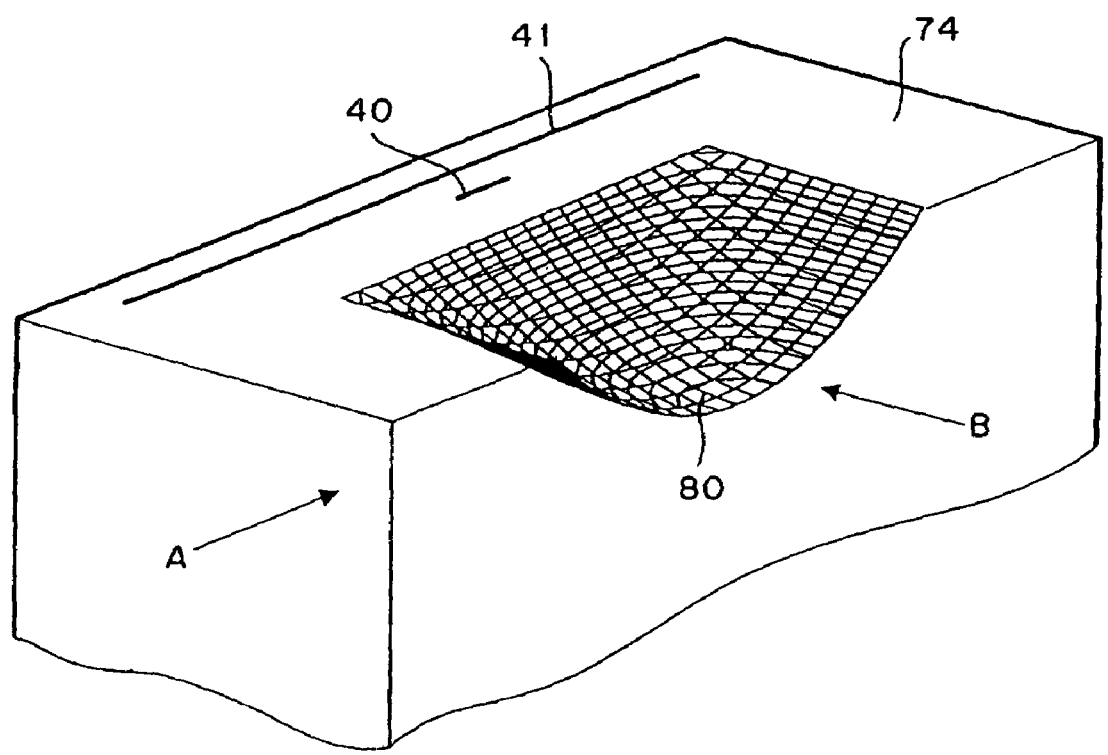
FIG. 10 is an enlarged fragmentary perspective view similar to FIG. 7, but showing a cavity having another shape.
Figure 11:
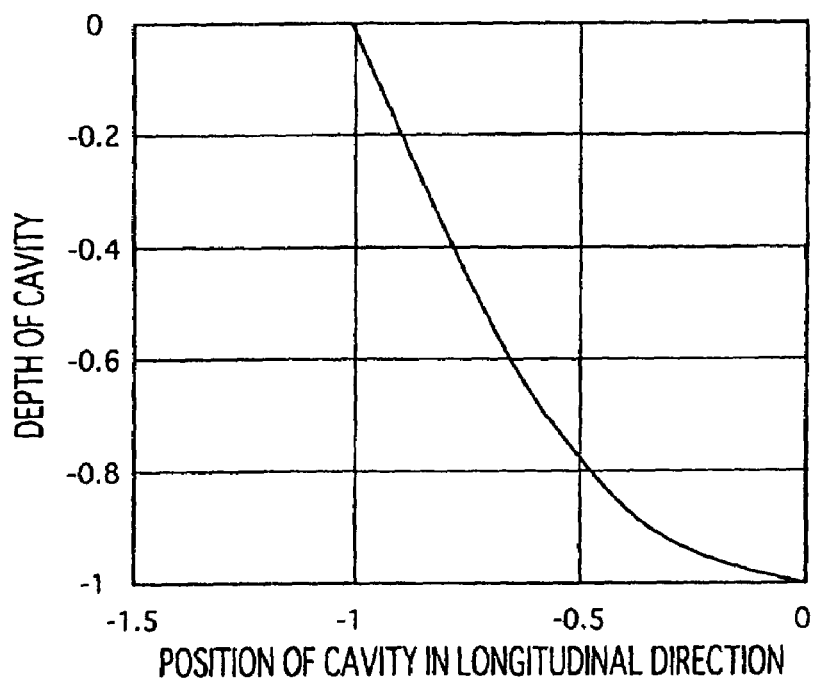
FIG. 11 is a diagram showing a cross-sectional shape of the cavity, as viewed in the direction indicated by the arrow A in FIG. 10.
Figure 12:
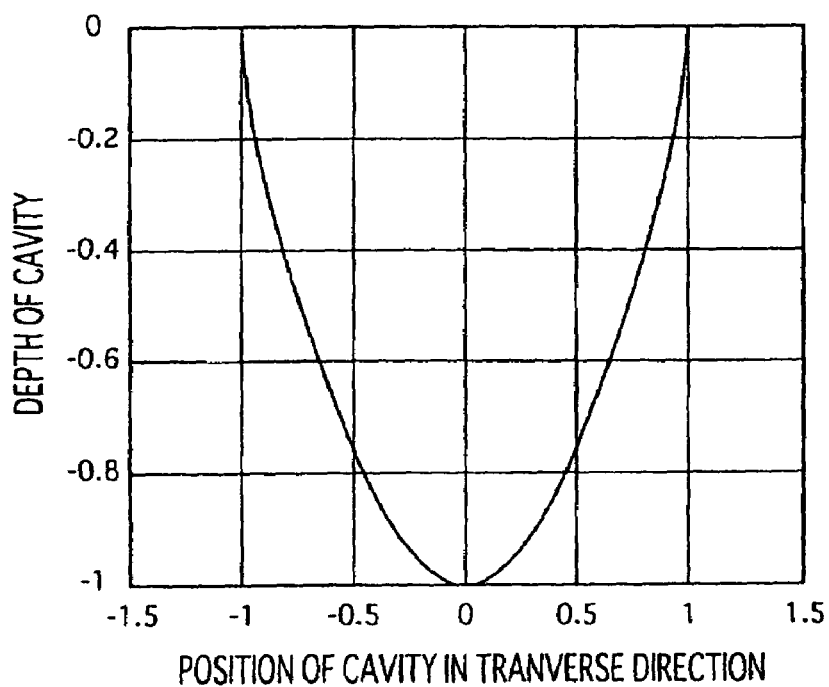
FIG. 12 is a diagram showing a cross-sectional shape of the cavity, as viewed in the direction indicated by the arrow B in FIG. 10.

FIG. 10 shows in enlarged fragmentary perspective a magnetic head slider near the electromagnetic transducer 40, the magnetic head slider having a cavity 80 whose shape is approximated by the equation (3), shown below, which is similar to the equation (2) except that both f(x) and g(y) are replaced with sine functions. FIG. 11 is a diagram showing a cross-sectional shape of the cavity 80, as viewed in the direction indicated by the arrow A in FIG. 10, and FIG. 12 is a diagram showing a cross-sectional shape of the cavity 80, as viewed in the direction indicated by the arrow B in FIG. 10.

$$z=[\sin\{(x-0.5)\pi\}/2-0.5][-\sin\{(y-0.5)\pi\}/2+0.5] \quad (3)$$

where z=the depth of the cavity (air bearing surface=0), x=the position of the cavity in the transverse direction (the center of the electromagnetic transducer 40=0), and y=the position of the cavity in the longitudinal direction (the air outlet end=0).

The units of x, y and z are dimensionless. The width of the cavity 80 is 200 μm, the length of the cavity 80 is 25 μm, and the depth of the cavity 80 is 30 nm.

Figure 13:
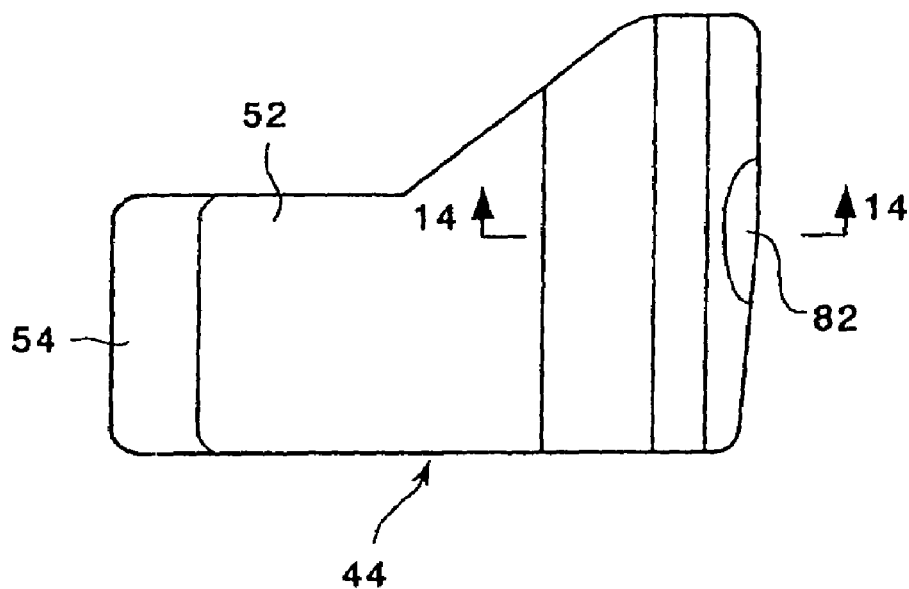
FIG. 13 is an enlarged plan view, similar to FIG. 4, but showing a rear rail having a cavity having another shape.
Figure 14:
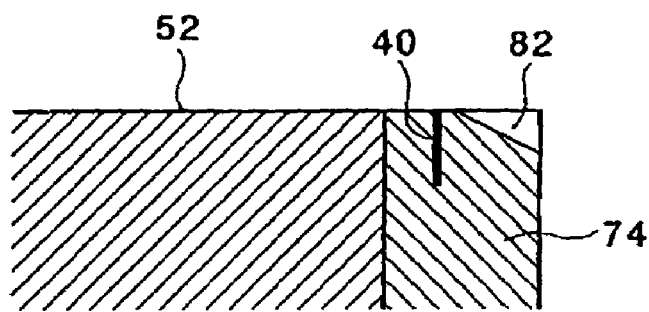
FIG. 14 is a cross-sectional view taken along line 14-14 of FIG. 13.

FIG. 13 shows in enlarged plan a rear rail 44 having a cavity 82 having another shape, and FIG. 14 is a cross-sectional view taken along line 14-14 of FIG. 13. According to the present embodiment, a portion of the protective film 74 that tends to project from the air bearing surface 52 due to thermal expansion when a predetermined voltage is applied to the electromagnetic transducer 40 is polished off. When the application of the voltage to the electromagnetic transducer 40 is stopped, the protective film 74 shrinks to form a cavity 82 in the air outlet end near the electromagnetic transducer 40. It is more effective to polish off the projecting portion while a predetermined voltage is being applied to the electromagnetic transducer 40 at a high temperature.

Figure 15:
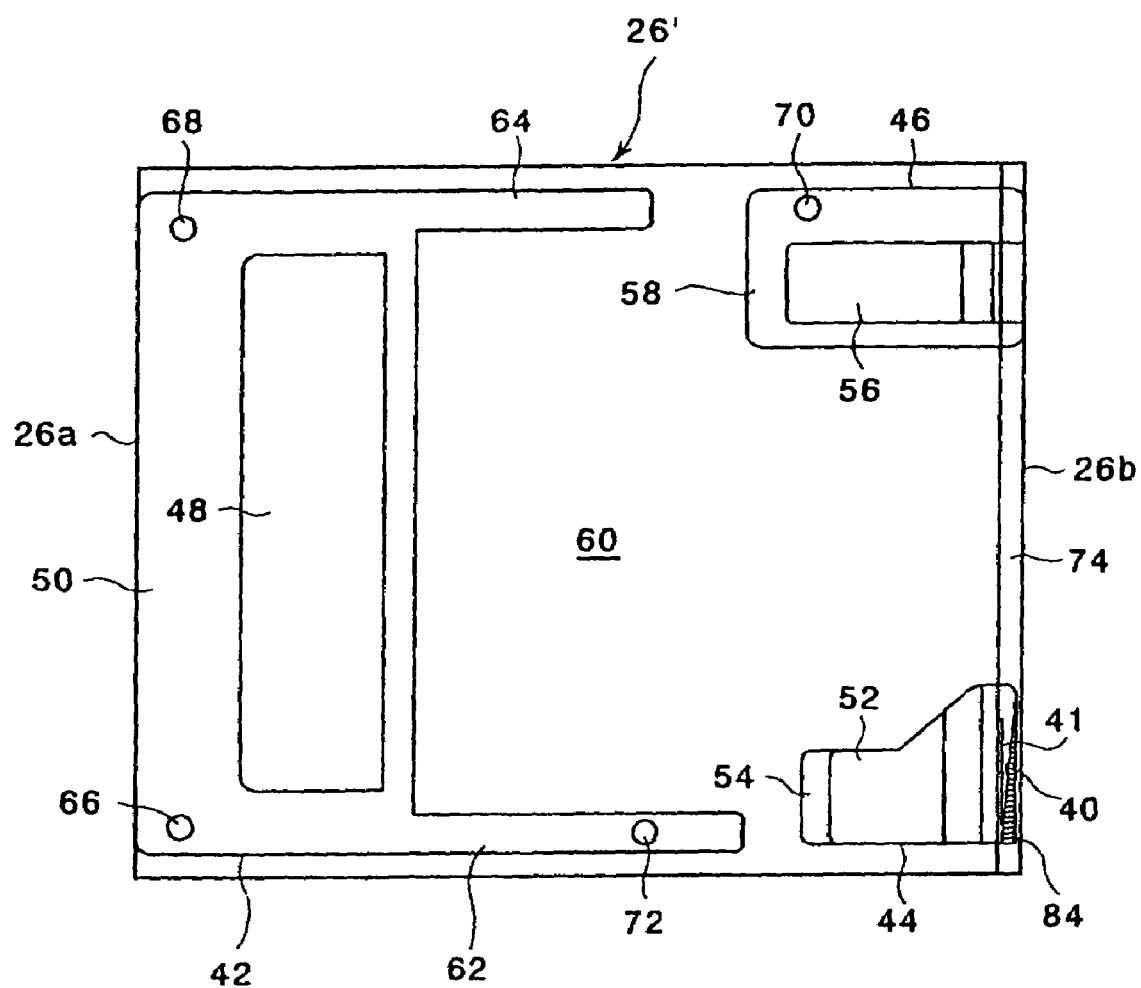
FIG. 15 is a plan view of a magnetic head slider according to another embodiment of the present invention.
Figure 16:
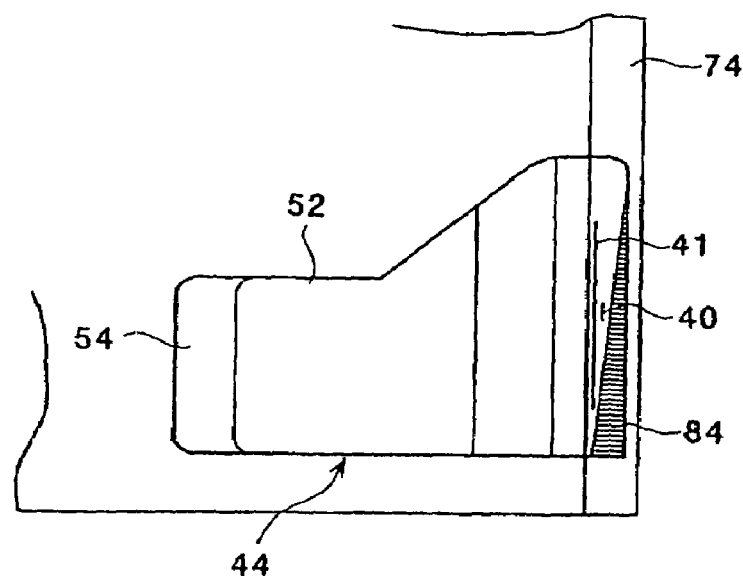
FIG. 16 is an enlarged fragmentary plan view of a rear rail.

FIG. 15 shows in plan a magnetic head slider 26' according to another embodiment of the present invention. FIG. 16 is an enlarged fragmentary plan view of the rear rail 44. According to the present embodiment, when a predetermined voltage is applied to the electromagnetic transducer 40 while the magnetic head slider 26' is normally floating off the magnetic disk, a portion of the magnetic head slider 26' which floats less than the electromagnetic transducer 40 is polished off, forming a cavity 84.

Figure 17A:
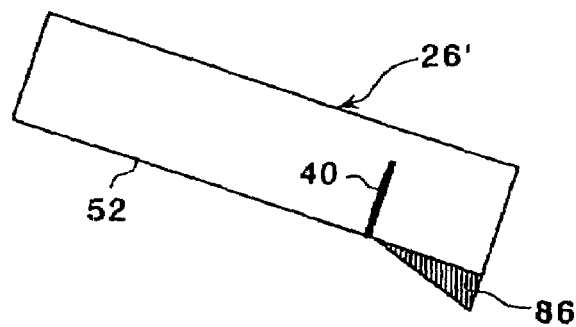
FIGS. 17A and 17B are views illustrative of a process of forming a cavity.
Figure 17B:
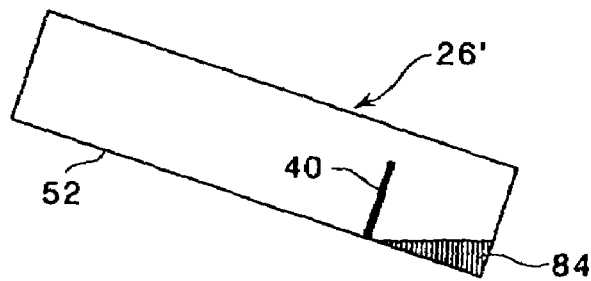

Specifically, as shown in FIG. 17A, when a predetermined voltage is applied to the electromagnetic transducer 40 while the magnetic head slider 26' is floating off the magnetic disk, the protective film 74 is thermally expanded and projects from the air bearing surface 52, as indicated by the reference numeral 86. According to the present embodiment, a portion of the magnetic head slider 26' including the projecting portion 86, which projects less than the electromagnetic transducer 40, is polished off. When the application of the voltage to the electromagnetic transducer 40 is stopped, the cavity 84 is formed as shown in FIGS. 16 and 17B.

Figure 20:
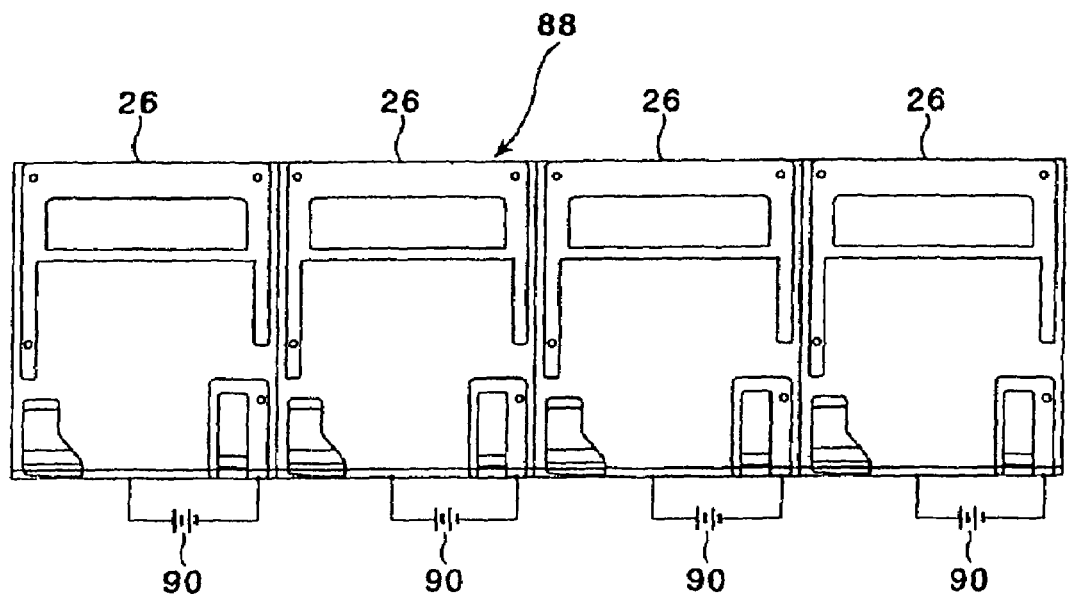
FIG. 20 is a plan view showing the manner in which projecting portions of the electromagnetic transducers are polished off while the voltage are being applied to each of the electromagnetic transducers mounted on the row bar.
Figure 21:
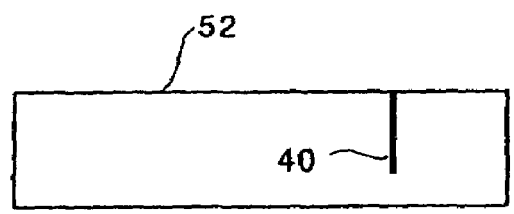
FIG. 21 is a schematic left-hand side elevational view of the electromagnetic transducers shown in FIG. 20.

FIG. 18 shows in plan a row bar 88 on which pluralities of magnetic head sliders 26 are arranged in a row. When a predetermined voltage is applied to the electromagnetic transducers 40 of the respective magnetic head sliders 26' from respective power supplies 90, the protective film near the electromagnetic transducer 40 of each magnetic head slider 26 is thermally expanded and projects upwardly from the air bearing surface 52, as indicated by the reference numeral 92 in FIG. 19. The projecting portion 92 is polished off while the voltage is being applied to each of the electromagnetic transducers 40. The electromagnetic transducers 40 from which the projecting portions 92 have been polished off are shown in FIGS. 20 and 21.

Figure 22:
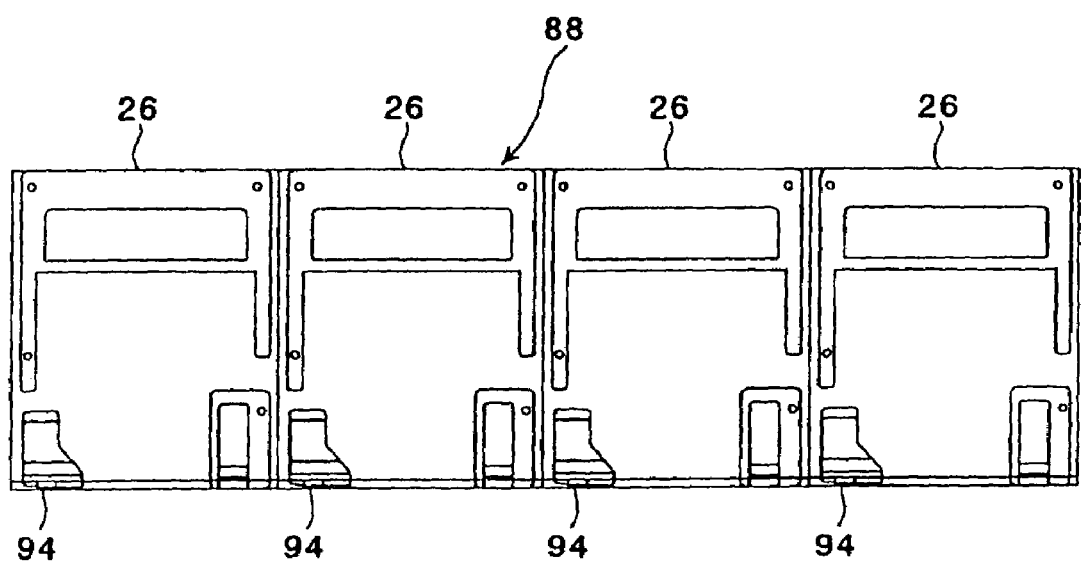
FIG. 22 is a plan view showing the manner in which the voltage is no longer applied to each of the electromagnetic transducers mounted on the row bar.
Figure 23:
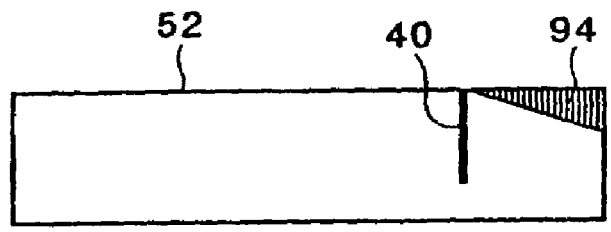
FIG. 23 is a schematic left-hand side elevational view of the electromagnetic transducers shown in FIG. 22.

When the application of the voltage to the electromagnetic transducers 40 is stopped, the protective films 74 shrink to form cavities 94 in the air outlet ends near the electromagnetic transducers 40, as shown in FIGS. 22 and 23. Thereafter, an ordinary magnetic head slider fabrication process is continued. The present embodiment is advantageous in that the efficiency with which to manufacture the magnetic head sliders 26 is high because the projecting portions 92 can be removed from the magnetic head sliders 26 mounted on the row bar 88.

Figure 24:
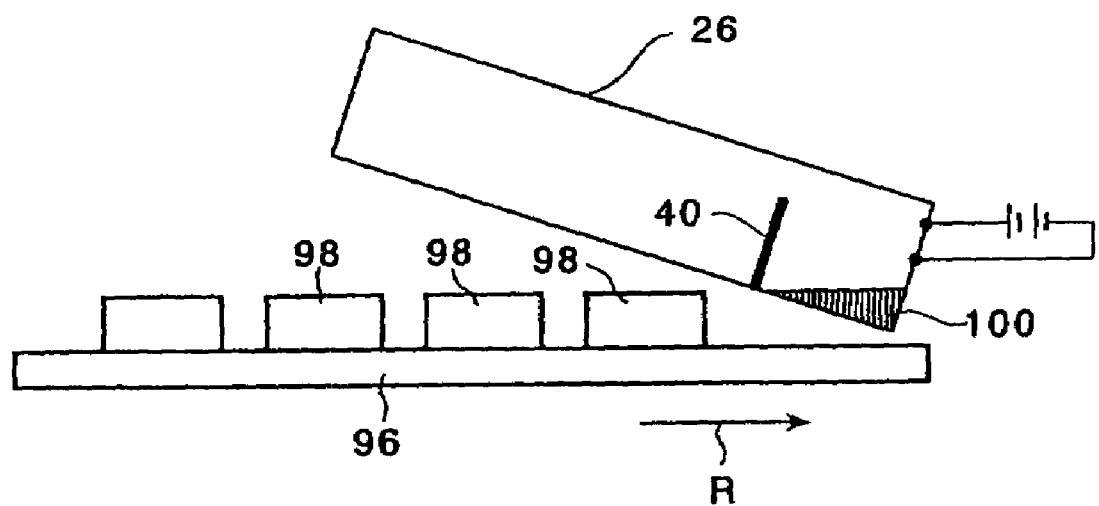
FIG. 24 is a schematic view illustrative of another process of forming a cavity adopted by the present invention.

FIG. 24 shows an embodiment in which a portion of the magnetic head slider 26 that floats less than the electromagnetic transducer 40 is polished off while the magnetic head slider 26 is being floating off the magnetic disk. According to the present embodiment, pluralities of polishing pads 98 arranged in a circular array are fixedly mounted on a disk 96. When the disk 96 rotates in the direction indicated by the arrow R, the magnetic head slider 26 floats a predetermined height from the surface of the disk 96 due to an airflow that is produced upon rotation of the disk 96, and a portion of the magnetic head slider 26 which floats less than the electromagnetic transducer 40 and a projecting portion near the electromagnetic transducer 40 which occurs upon application of a voltage to the electromagnetic transducer 40 are polished off by the polishing pads 98. The portions thus polished off are represented by the reference numeral 100 in FIG. 24.

According to the present invention, as described above, since a cavity is defined in the air outlet end of a magnetic head slider near an electromagnetic transducer, a portion of the magnetic head slider near the electromagnetic transducer is prevented from projecting even when the electromagnetic transducer is heated, thus preventing a head crash from occurring. The present invention is particularly advantageous when applied to a magnetic disk apparatus having a high data transfer rate that employs a low-floating magnetic head slider.

The present invention is not limited to the details of the above-described preferred embodiments. The scope of the invention is defined by the appended claims and all changes and modifications as fall within the equivalence of the scope of the claims are therefore to be embraced by the invention.

What is claimed is:

1. A method of manufacturing a head slider having a top surface with a head element located on the top surface near an air outlet end, comprising the steps of:
   rotating a polishing member at a predetermined rotational speed;
   causing the head slider to float above the polishing member with an airflow which is generated between the top surface and the polishing member when the polishing member is rotated;
   supplying a predetermined power to said head element; and
   polishing off at least a portion of the head element which projects from the top surface when said predetermined power is supplied to said head element for shaping a cavity on the head element.

2. A method according to claim 1, wherein said polishing step further includes polishing off a portion of the head slider which floats less than said head element.

3. A method according to claim 1, wherein said cavity is approximated by a curved surface that is represented by:

$$z=f(x)\cdot g(y)$$

where z represents the depth of the cavity, x the position thereof in the longitudinal direction of the head slider, y the position thereof in the transverse direction of the head slider, $f(x)=a_m x^m + a_{m-1} x^{m-1} + \ldots + a_1 x + a_0$, $g(y)=b_n y^n + b_{n-1} y^{n-1} + \ldots + b_1 y + b_0$, and m and n are integer of 2 or greater.

4. A method according to claim 3, wherein said cavity is approximated by a curved surface which is represented by an equation which is similar to said equation except that at least one of $f(x)$ and $g(y)$ is replaced with a sine function.

* * * * *